Fig. 1.

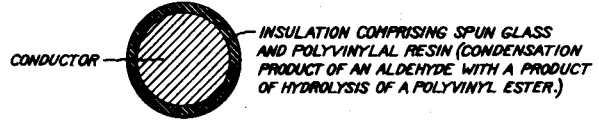

CONDUCTOR

INSULATION COMPRISING SPUN GLASS AND POLYVINYLAL RESIN (CONDENSATION PRODUCT OF AN ALDEHYDE WITH A PRODUCT OF HYDROLYSIS OF A POLYVINYL ESTER.)

Fig. 2.

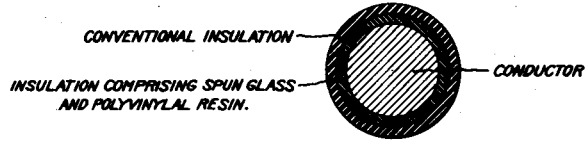

CONVENTIONAL INSULATION

INSULATION COMPRISING SPUN GLASS AND POLYVINYLAL RESIN.

CONDUCTOR

Fig. 3.

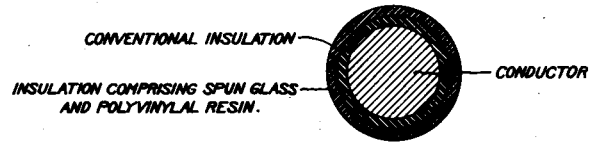

CONVENTIONAL INSULATION

INSULATION COMPRISING SPUN GLASS AND POLYVINYLAL RESIN.

CONDUCTOR

Fig. 4.

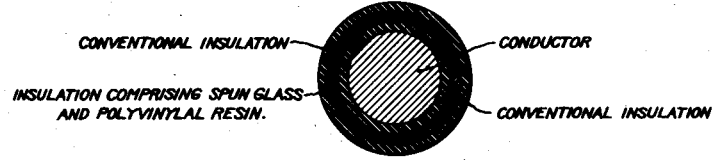

CONVENTIONAL INSULATION

INSULATION COMPRISING SPUN GLASS AND POLYVINYLAL RESIN.

CONDUCTOR

CONVENTIONAL INSULATION

Inventors
Ralph W. Hall,
Henry A. Smith,
by Harry E. Dunham
His Attorney.

Patented May 27, 1941

2,243,560

UNITED STATES PATENT OFFICE 2,243,560

INSULATED ELECTRICAL CONDUCTOR

Ralph W. Hall and Henry A. Smith, Fort Wayne, Ind., assignors to General Electric Company, a corporation of New York Application July 8, 1938, Serial No. 218,134

7 Claims. (Cl. 174—121)

This invention relates to insulated electrical conductors. It is concerned more particularly with electrical conductors provided with insulation comprising spun glass, also known as fiber glass.

It has been suggested heretofore to use spun glass as insulation for electrical conductors, but for various reasons the material has not gone into extensive use. Among the principal objections to spun glass as electrical insulation have been the difficulties in applying it to conductors such, for instance, as bare copper wire and in holding the applied glass firmly in place. The ends of the glass filaments would break off and irritate the hands of the workmen. Further, the glass threads would unravel from the glass-insulated wire. Adhesives heretofore proposed for bonding the glass filaments to each other and to the wire have been deficient in one or another of the requisite properties necessary to meet the service requirements of the insulated conductor. Thus, one cementing agent might have adequate wetting power for the spun glass and sufficient adhesiveness, but would lack flexibility. Another might be sufficiently flexible but would have a low dielectric strength. Another might have good dielectric properties and adhesiveness, but would be incapable of withstanding the temperatures encountered during operation of the electrical apparatus.

Adhesives heretofore suggested for use in applying spun glass therefore represented a compromise between these properties.

In accordance with the present invention we utilize as insulation for electrical conductors spun glass suitably combined with a resinous composition of the class produced by condensing an aldehyde with a product of hydrolysis of a polyvinyl ester. Such resinous compositions are described, generally, in Reissue Patent No. 20,430, Morrison et al., and, as pointed out in said patent, may be produced from various aldehydes and various polyvinyl esters. In the following description of the invention and in the appended claims, this class of resins is designated, generally, as "polyvinylal resins."

The novel features of our invention are set forth in the appended claims. The invention itself, however, will be understood most readily from the following specification when considered in connection with the accompanying drawing in which:

Fig. 1 is a cross-sectional view of an electrical conductor having superposed directly thereon insulation formed of spun glass in combination with a resinous composition comprising a polyvinylal resin;

Fig. 2 is a similar view showing conventional insulation applied over the insulation of Fig. 1;

Fig. 3 is a view similar to Figs. 1 and 2 showing the insulation of Fig. 1 applied over conventional insulation; and Fig. 4 is a view similar to the other figures, but showing the insulation of Fig. 1 sandwiched between layers or coatings of conventional insulation.

In order that those skilled in the art better may understand the type of resinous compositions which are used in combination with spun glass to provide the improved insulated conductors of the present invention, the following illustrative example of the preparation of a polyvinylal resin is given:

One hundred parts of a polymerized vinyl acetate is dissolved in 185 parts of glacial acetic acid. To this is added 83 parts of an aqueous solution of formaldehyde, containing $37\frac{1}{2}$ per cent of formaldehyde, and a suitable amount of mineral acid, for example 6.8 parts of concentrated sulfuric acid. All proportions herein given are by weight. Hydrolysis is carried out at about 70° C. in an enameled vessel. Samples of the reaction mixture are removed at suitable intervals of time and analyzed for their formaldehyde content. The results of analyses indicate the extent to which the polyvinyl ester has been converted into polyvinyl formal. When the desired degree of conversion has been effected, a suitable amount of neutralizing agent, for example 13 parts of concentrated ammonia, is added to the reaction vessel. The neutralized mass is poured as a thin stream into water, whereupon the reaction product is precipitated in the form of threads. The thread-like material is washed with water and dried in a current of warm (60° C.) air. The dried threads are white, or nearly so.

Aldehydes other than formaldehyde may be used in making polyvinylal resins, for example, acetaldehyde, propionic aldehyde, butyric aldehyde, benzaldehyde and the like. Likewise polyvinyl esters other than polyvinyl acetate may be employed, for instance polyvinyl propionate, polyvinyl butyrate and the like. The properties of polyvinylal resins may be varied through a wide range by varying the viscosity and the extent of the hydrolysis of the polyvinyl ester, the amount and the character of the aldehyde reacted with the hydrolyzed polymerized vinyl ester, and the character and the amount of the acid catalyst used.

One method of insulating conductors in accordance with the present invention comprises first applying a layer of spun glass to the bare conductor, which may be, for example, a copper wire. The glass may be applied in various ways. For instance, it may be in thread or tape form and may be wrapped upon the wire. Or it may be applied to the wire in felted or mat form, using apparatus similar to that employed in applying felted asbestos to wire.

The glass-covered conductor is treated with polyvinylal resin, preferably in solution state. As a solvent for the polyvinylal resin we may use, for example, furfural, ethylene dichloride, dioxan, chloroform, or a mixed solvent formed, for instance, of an aromatic hydrocarbon such as benzene, toluene, or xylene and any one or more of the following monatomic saturated alcohols: methyl, ethyl, n-propyl, n-butyl, n-amyl, hexyl or octyl. The percentage by weight of the alcohol in such a solvent mixture may vary, for instance from 20 to 40 per cent, the remainder being aromatic hydrocarbon. A more specific example of a suitable solvent is one formed, by weight, of approximately 25 per cent ethyl alcohol and approximately 75 per cent toluene.

The resin solution as applied to the spun glass may contain any suitable amount of polyvinylal resin, but ordinarily will contain from about 5 to 20 per cent by weight of resin. We have found that a binder formed of a solution containing approximately 10 to 15 per cent by weight of a polyvinylal resin obtained by condensing formaldehyde with a product of hydrolysis of polyvinyl acetate is particularly adapted for wetting and bonding together spun glass filaments and in causing firm adherence of the spun glass to the wire.

The resin solution may be applied to the glass-covered wire in any suitable manner. For example, the usual wire-enameling apparatus may be employed, together with a suitable wiper for removing excess enamel. The concentration of the solution, the rate of travel of the wire therethrough and the number of times the wire is passed through the solution are varied as may be necessary in order to impregnate the spun glass with resin to the desired degree. In the case of conductors of small diameter such, for instance, as copper wires used in winding coils, the spun-glass covering should be coated and partly, but not completely impregnated with polyvinyl resin in order to obtain an insulating layer so flexible that it may be sharply bent without cracking. For larger conductors, which are less sharply or less frequently bent and where therefore a highly flexible insulation is of lesser importance, the glass covering may be coated and completely impregnated with polyvinylal resin.

The resin-treated glass-covered wire is baked at an elevated temperature, for example, by continuously passing the wire through an electrically heated oven maintained at such temperature that the solvent will be evaporated and the resin converted to a hard, flexible, tough, abrasion- and moisture-resistant state. Heating the covered wire, for instance, at a temperature as high as about 350° C. for a period of the order of about one-half minute after each application of polyvinyl-resin enamel or varnish ordinarily is sufficient to produce the desired results. From a practical standpoint, heating the resin-coated and -impregnated wire at a temperature above the boiling point of the solvent present in the varnish is desirable. In all cases, the higher the temperature employed, the shorter the period of heating; and, conversely, the lower the temperature, the longer the heating time.

The wire, insulated as above described, advantageously is polished by passing it through a high speed rotating polisher such, for instance, as the kind employed in smoothing a cotton covering upon wire. In this way surface irregularities are removed. If desired, the covered conductor may be heated further during or after the polishing operation. The composite insulation thus obtained is smooth, tough, moisture- and abrasion-resistant, of uniform thickness, and of high dielectric strength. As previously mentioned, its flexibility may be varied by varying the extent to which the spun glass covering is impregnated with polyvinylal resin.

The insulated conductor made as set forth above may be further treated, as desired or as conditions may require. For instance, a coating of wax may be applied over the described insulation and the wire again polished to cause the wire to run more easily on winding machines. For certain purposes it may be desirable to apply one or more coatings of conventional insulation over the new composite insulation, as shown in Fig. 2. Depending upon the particular conditions of service use, the conventional insulation may be an ordinary organic enamel. Or, it may be some other insulating material as, for example: natural or synthetic rubber; cotton; paper; varnished cambric; natural or artificial silk; regenerated cellulose; cellulose derivatives such as cellulose esters, for instance, cellulose acetate, cellulose triacetate, cellulose propionate, cellulose butyrate, etc., or cellulose ethers such as ethyl cellulose, benzyl cellulose, etc.; or various synthetic resins such, for example, as flexible alkyd resins, plasticized polyvinyl chloride, polyacrylates such as polymerized ethyl ester of acrylic acid, rubber hydrochloride, etc. If desired, the new insulating material may be sandwiched between layers or coatings of conventional insulating substances as shown in Fig. 4.

We have found that the adherence of the spun glass to the wire may be improved by the following procedure: First, coat the wire with an ordinary organic enamel which will soften in the presence of heat or solvents or both. Thus we may coat the bare wire advantageously with, for instance, an enamel of the oleo-resinous type, apply spun glass over the dried or partially dried enamel, and finally coat and at least partly impregnate the spun glass with a polyvinylal resin as above described. Apparently enough solvent from the polyvinylal-resin varnish penetrates the applied spun glass to cause a slight softening of the enamel. As a result, the enamel adhesively holds the spun glass firmly in place upon the wire. Fig. 3 is illustrative of a conductor insulated in this manner.

For certain applications it is advantageous to modify the polyvinylal resin by incorporating therewith, prior to use, a suitable proportion, for example up to 50 per cent by weight, preferably from about 5 to 40 per cent, of a potentially reactive (heat-hardenable) synthetic resin. Examples of such resins are those known, generally, as phenol-aldehyde, urea-aldehyde, aniline-aldehyde resins, and the like. A phenol-formaldehyde resin is a preferred modifying agent. The potentially reactive resin is converted to an insoluble and infusible state by the heat treatment given the coated wire or during its subsequent service use. The presence of such heatresisting resin in the binder serves to increase the resistance to flow of the polyvinylal resin at any abnormally high temperatures which may be encountered during use of the insulation in electrical apparatus, without materially affecting the high dielectric strength and wetting power toward spun glass of the polyvinylal resin.

Other addition materials also may be incorporated in the resinous binder, as desired or as conditions may require. For example, to increase the stability of the polyvinylal resin we may add thereto a small amount, for instance, from 0.1 to 2.0 per cent of a suitable stabilizing material or anti-oxidant. Examples of compounds that have such a stabilizing effect on polyvinylal resins are described, for instance, in the co-pending application of Birger W. Nordlander, Serial No. 149,668, filed June 22, 1937, now Patent No. 2,195,122, and in the co-pending application of Birger W. Nordlander and Robert E. Burnett, Serial No. 161,796, filed August 31, 1937, now Patent No. 2,216,020, both of which patents are assigned to the same assignee as the present invention. Dyes or pigments also may be incorporated, if desired, in the modified or unmodified polyvinylal resin.

Still another method of insulating conductors in accordance with the present invention is to apply the above-described composite insulation as a unit. For example, we may prepare a suitable solution of the polyvinylal resin and apply such solution by means of a spray apparatus to felted spun glass carried on a conveyor belt or apron. When the sheet spun glass initially has adequate strength, for instance when in the form of a woven cloth, it may be coated and impregnated somewhat more conveniently by passing it through a bath formed of a suitable solution of polyvinylal resin. The sprayed or the immersed material is dried. Such spraying or immersing operations may be repeated, as desired or as may be necessary, in order to obtain a material of the desired thickness. When felted spun glass has sufficient spray-deposited coating of polyvinylal resin thereon to give it adequate strength, it may be passed through a bath of polyvinylal resin and further coated in this way.

Another method of making the unitary insulation is to employ the polyvinylal resin in plastic state, using heat, pressure or solvents, or any combinations thereof, as desired or as may be required, to cause the polyvinylal resin to assume a plastic state. The plastic resin is applied to spun glass sheet material, in felted or woven state, under pressure, preferably under heat and pressure, using, if necessary, a small amount of a solution of a polyvinylal resin as an adhesive to aid in the combination of the materials. The combined material is oven baked to expel solvents, if any are present in the mass, and to convert the polyvinylal resin to a hard, tough, flexible, abrasion- and moisture-resistant state.

Unitary insulating structures comprising sheet spun glass having polyvinylal resin on either or both sides may be made as above described. To either or both sides of such insulation may be bonded, by any suitable means, any conventional insulating material such, for instance, as those mentioned hereinbefore.

Flexible unitary insulating materials produced in the manner above set forth may be applied to a conducting surface such as a metallic core of stranded or solid wire in any known manner, as for example, by the strip-covering method.

In the co-pending application of Edward H. Jackson and Ralph W. Hall, Serial No. 218,135, filed concurrently herewith, and assigned to the same assignee as the present invention, is disclosed and claimed a conductor insulated with a phenol-aldehyde modified polyvinylal resin. The present invention is separate and distinct therefrom, being directed to an insulated conductor in which the insulation comprises spun glass suitably combined with polyvinylal resin either in an unmodified state or modified by incorporating therewith a heat-hardenable resin.

What we claim as new and desire to secure by Letters Patent of the United States is:

1. An insulated electrical conductor in which the insulation comprises a combination of spun glass and polyvinylal resin.

2. An electrical conductor insulated with a layer of spun glass, said layer being coated and at least partly impregnated with a polyvinylal resin in a hard, tough, flexible and abrasion-resistant state.

3. An electrical cable comprising a conducting core and insulation therefor comprising spun glass bonded together with a cementing agent comprising a polyvinylal resin heat-treated to convert it to a hard, tough, flexible and abrasion-resistant state.

4. An electrical cable comprising a conductor having superposed directly thereon an organic enamel and upon the said enamel a tightly adhering layer of insulation composed of spun glass coated and partly but not completely impregnated with a heat-treated, hard, tough, flexible, abrasion-resistant polyvinylal resin obtained by condensing formaldehyde with a product of hydrolysis of polyvinyl acetate.

5. An insulated electrical conductor having as insulation a layer of spun glass coated and partly but not completely impregnated with a polyvinylal resin modified with a potentially reactive resin, said insulation being hard, tough, flexible, heat- and abrasion-resistant, and of high dielectric strength.

6. An electrical cable comprising a metallic conductor having superposed directly thereon a coating of an organic enamel and over said coating and in contact therewith an insulating layer comprising a mass of glass fibers bonded together with a composition comprising a polyvinylal resin in a hard, tough, flexible and abrasion-resistant state.

7. An insulated wire in which the insulation comprises a combination of fiber glass and a polyvinylal resin modified with a phenol-aldehyde resin.

RALPH W. HALL.
HENRY A. SMITH.